United States Patent [19]
Speicher

[11] 4,332,426
[45] Jun. 1, 1982

[54] RECIRCULATION BEARING FOR ROLLING ARC GIMBAL

[75] Inventor: John M. Speicher, Upland, Calif.

[73] Assignee: General Dynamics, Pomona Division, Pomona, Calif.

[21] Appl. No.: 200,658

[22] Filed: Oct. 27, 1980

[51] Int. Cl.³ .................. F16C 11/00; F16M 11/12
[52] U.S. Cl. ...................... 308/2 R; 308/6 C; 248/184; 248/661; 343/882
[58] Field of Search ............ 308/2 R, 6 C, 185; 248/184, 661, 664, 667; 343/839, 869, 880, 882

[56] References Cited

U.S. PATENT DOCUMENTS

| | | | |
|---|---|---|---|
| 3,464,283 | 9/1969 | Miller et al. | 308/2 R |
| 3,527,435 | 9/1970 | Lapp et al. | 343/882 |
| 3,721,478 | 3/1973 | Anderson et al. | 308/6 C |
| 3,752,541 | 8/1973 | McVey | 308/6 C |
| 3,934,946 | 1/1976 | Burr et al. | 308/6 C |
| 4,215,906 | 8/1980 | Speicher | 308/219 |

FOREIGN PATENT DOCUMENTS

| | | | |
|---|---|---|---|
| 19577 | 4/1919 | Fed. Rep. of Germany | 308/185 |
| 488310 | 7/1928 | Fed. Rep. of Germany | 308/185 |
| 2416250 | 10/1974 | Fed. Rep. of Germany | 308/6 C |
| 730922 | 8/1932 | France | 308/6 C |
| 591067 | 4/1959 | Italy | 308/6 C |

*Primary Examiner*—Richard R. Stearns
*Attorney, Agent, or Firm*—Neil F. Martin; Freling E. Baker; Edward B. Johnson

[57] ABSTRACT

A rolling arc gimbal mount includes a base having means for attachment to a support structure and an arcuate yoke supported in the base by recirculating bearing means. The recirculating bearing including a raceway formed in opposite sides of the yoke and in opposed facing mounts on the support structure with plurality of balls or rollers disposed between the yoke guideway and the base guideway and including recirculating guides.

12 Claims, 7 Drawing Figures

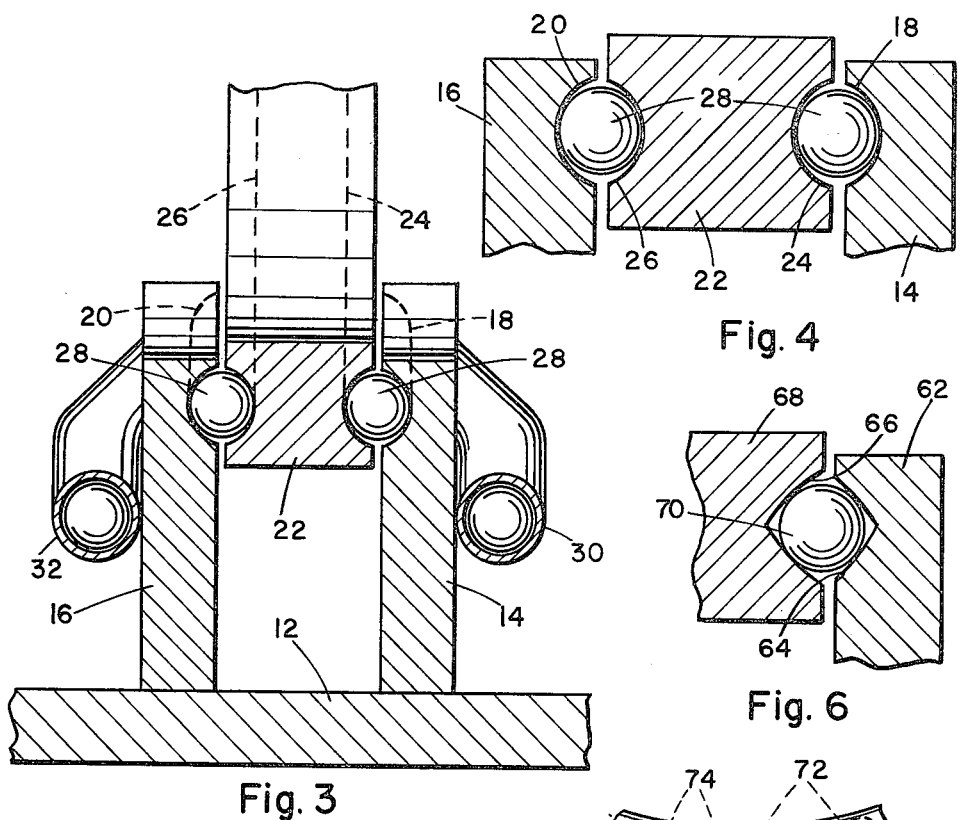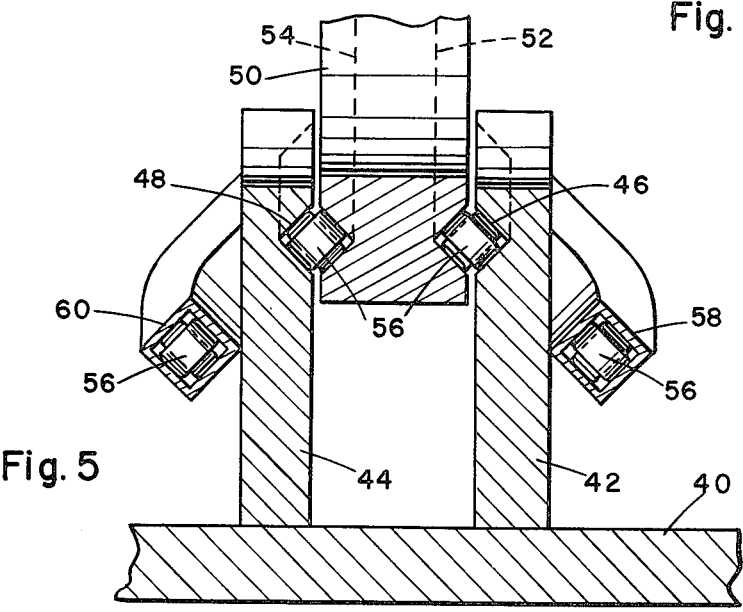

RECIRCULATION BEARING FOR ROLLING ARC GIMBAL

BACKGROUND OF THE INVENTION

The present invention relates to mounting systems and pertains particularly to an improved mounting gimbal for sensing devices such as radars, antennas and the like.

Radar antennas and other similar sensing mechanisms are typically mounted for selective orientation and scanning of a hemispherical direction. The mountings of such sensing devices must be lighweight and rugged to enable fast and accurate scanning or sweeping of the antenna. At the same time such mountings must be precise and accurate in order to insure stable, precise and accurate alignment of the sensing device. Various types of mounting gimbals are known in the art and each have their own advantages and disadvantages. The present invention is directed to a rolling arc type gimbal and improvements therein.

It is therefore desirable that an improved mounting for rolling arc gimbal structure be provided.

SUMMARY AND OBJECTS OF THE INVENTION

It is the primary object of the present invention to provide an improved rolling arc type gimbal mount.

In accordance with the primary aspect of the present invention a rolling arc type gimbal mounting assembly includes roller bearing track formed in opposed sides of the mounting yoke and cooperating fixed raceways formed on a base support structure with rollers disposed between the yoke and the fixed raceway for supporting the rolling arc of yoke and the gimbal structure.

BRIEF DESCRIPTION OF THE DRAWINGS

The above and other objects and advantages of the invention will become apparent from the following description when read in conjunction with the drawings wherein:

FIG. 3 is an enlarged sectional view taken on line 3—3 of FIG. 1.

FIG. 4 is a further enlarged view of a portion of FIG. 3 showing details of construction.

FIG. 5 is a sectional view similar to FIG. 3, showing an alternate embodiment.

FIG. 6 is a sectional view similar to a portion of FIG. 4 showing an alternative raceway configuration.

FIG. 7 illustrates a portion of a return guide containing alternate large and small balls.

DETAILED DESCRIPTION OF A PREFERRED EMBODIMENT

Figure 1:
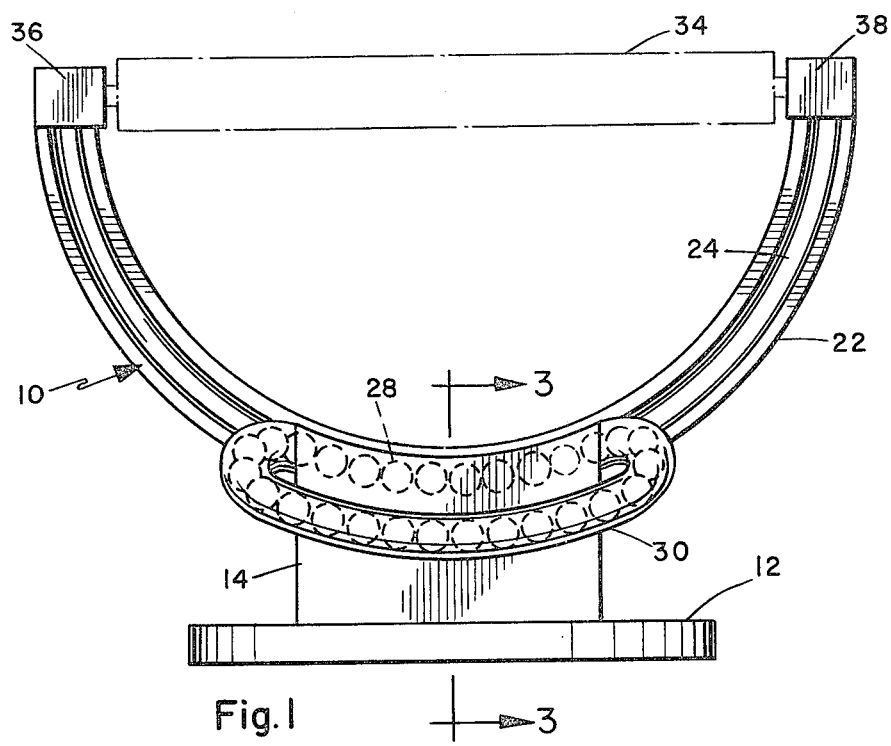
FIG. 1 is a side elevation view of a rolling arc gimbal in accordance with the invention.
Figure 2:
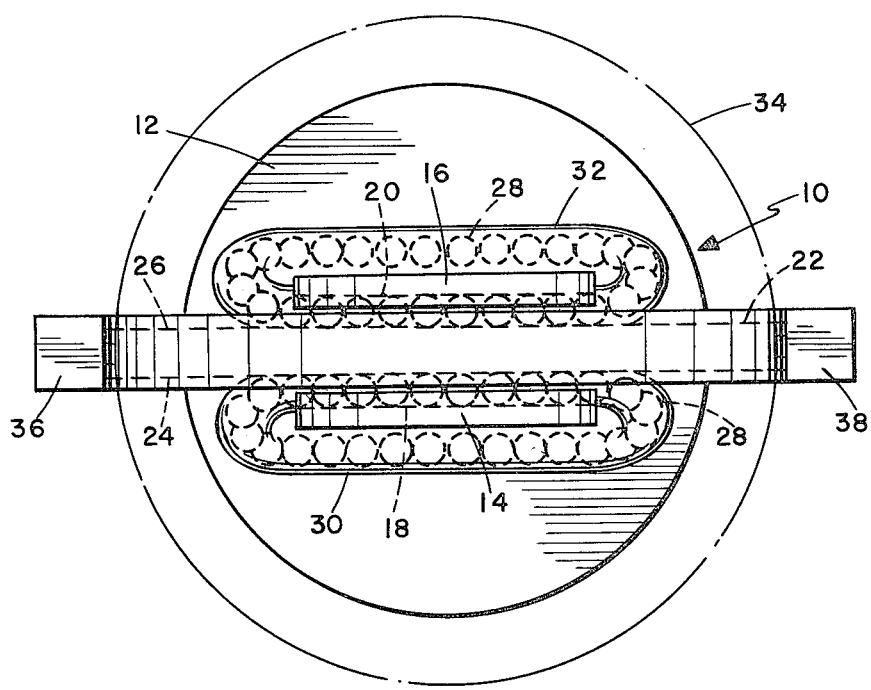
FIG. 2 is a plan view of the gimbal mount of FIG. 1.

Turning to FIGS. 1, 2 and 3 of the drawings, a rolling arc gimbal designated generally by the numeral 10 is illustrated having a base support structure 12 adapted to be attached to a mounting and including a pair of spaced apart vertically extending brackets 14 and 16. Each of these separate brackets include a fixed curved or arcuate raceway 18 and 20 formed therein. These are disposed in opposed relation and a ring segment or arc 22 is disposed therebetween and similarly includes at each side thereof a raceway 24 and 26, extending substantially the length of the ring. The ring or arcuate yoke is disposed between the vertically disposed bracket members 14 and 16 with the respective fixed and movable races in opposed relation thereto defining a raceway channel therebetween in which is disposed a plurality of rollers 28. These rollers 28 as illustrated include a plurality of spherical balls disposed therein and including return guides 30 and 32 for each respective raceway. Balls or spheres continue circulation around the endless or closed path permitting the ring to roll between its opposite ends within the mounting. Mounted within the ring 22 is a platform 34 which is mounted in journals 36 and 38 for rotation about an axis transverse to that of the ring. Sensing platform 34 may mount a radar antenna, optical antenna or the like.

Turning to FIG. 4, details of the mounting structure is shown illustrating the opposed raceways. The raceways 18, 20, 24 and 26 have arcuate cross sections with a diameter exceeding that of the spherical balls 28, such that rolling friction is considerably reduced thereby.

Turning to FIG. 5 of the drawing, there is illustrated an alternate embodiment of the invention having x-axis or cross axis rollers. In the illustrated embodiment a base member 40 includes a pair of spaced apart upright bracket members 42 and 44 having v-shaped cross section arcuate shaped grooves or raceways 46 and 48 formed therein. Disposed between the raceways is the ring 50 of the gimbal assembly which includes v-shaped arcuate raceways 52 and 54 extending along the opposite sides of the ring from one end thereof to the other end. These raceways are disposed in opposed relationship with the stationary raceway and a plurality of cylindrical rollers 56 are disposed in the raceways between the two members for mounting the ring with respect to the stationary races and the base member. The rollers 56 are mounted with their axes crossed or at 90 degree to the axes of each adjacent roller. Low friction inserts may be disposed between each adjacent roller.

The raceways form an essentially square tube which connects with a tubular roller return guide 58 and 60 disposed and secured to the base member and communicating with opposite ends of the stationary races. The rollers are then communicated between the opposite ends thereof through the tubular return guide. The x-axis rollers may include bearing inserts (not shown) disposed between the rollers, such as nylon bearings or the like. This arrangement provides a very accurate and stable support structure for the rolling arc gimbal.

With the x-roller arrangement very close adjustment can be made in the support of the ring with the rollers essentially eliminating substantially all slack or play within the mounting. Thus a highly accurate and stable mounting is obtained.

Turning to FIG. 6, the zero slip four-point contact thrust bearing of my U.S. Pat. No. 4,215,906 granted Aug. 5, 1980 is illustrated. This thrust bearing is more fully illustrated and described in my aforementioned patent which is incorporated herein my reference as though fully set forth. A stationary member 62 includes a raceway 64 that is disposed in mating or opposed relation to a race 66 of a ring 68. A series of balls 70 are disposed in the raceway and a return guide as previously described recirculate the balls.

Another feature of the invention as shown in FIG. 7 is the provision of spacer between the load supporting rollers or balls. As illustrated, a series of load supporting balls 72 are spaced apart by means of smaller spacer balls 74 as they move within a raceway or return guide 76. The smaller balls 74 may be formed of any suitable material such as nylon or other plastic or even still. They function to space the load carrying balls apart from reducing friction therebetween. Similar spacers (not shown) could be used in conjunction with the rollers.

While I have illustrated and described my invention by means of specific embodiments, it is to be understood that numerous changes and modifications may be made therein without departing from the spirit and scope of the invention as defined in the appended claims.

Having described my invention, I now claim:

1. A rolling arc gimbal mount comprising:
   a base adapted to be supported by a supporting structure;
   an arcuate substantially semicircular yoke supported by recirculating bearing means in said base for rotation about its axis, said bearing means including rolling elements guided in a closed path having loaded and unloaded portions, said loaded portion being substantially arcuate; and
   a platform pivotally mounted in said yoke for rotation about an axis orthogonal to the axis of rotation of the yoke.

2. The rolling arc gimbal of claim 1, wherein:
   said base includes a pair of spaced apart stationary races,
   said yoke is disposed between said races and includes a pair of races on each side thereof disposed in opposition to said stationary races, and
   a plurality of rolling elements disposed between and in rolling engagement with said races for supporting said yoke on said base.

3. The rolling arc gimbal mount of claim 2, wherein said races on said yoke and said stationary races are arcuate in configuration and have an axis coincident with the axis of said yoke.

4. The rolling arc gimbal of claim 3, wherein said rolling elements are spherical balls.

5. The rolling arc gimbal of claim 3, wherein said rolling elements are generally cylindrical in configuration and alternate elements have their axes crossed.

6. The gimbal structure of claim 1, wherein said rolling elements are ball bearings.

7. The gimbal structure of claim 1, wherein said rolling elements are substantially cylindrical and the axis of adjacent rolling elements are normal to each other.

8. A rolling arc gimbal support structure for a sensing platform comprising:
   a base member;
   an arcuate fixed race secured to the base;
   a gimbal ring segment having a mobile race adapted to mate with said fixed race for containing a plurality of rolling elements between said races;
   a plurality of rolling elements disposed in said races between said fixed race and said mobile race for supporting said gimbal ring segment for movement on said base for rotation about its axis, and
   return guide means for conveying said rolling elements between opposite ends of said fixed race for recirculating said rolling elements upon movement of said mobile race.

9. The rolling arc gimbal support structure of claim 8, including a platform mounted in said yoke for rotation about an axis orthogonal to the axis of rotation of the yoke.

10. The gimbal of claims 3, 4 or 6 wherein said races are formed to provide a zero slip four-point contact thrust bearing.

11. The gimbal of claims 3, 4, 6, or 8 including spacer means between said rolling elements.

12. The gimbal of claim 8 wherein:
   said races are formed to provide a zero slip four-point contact thrust bearing, and
   spacer means disposed between said rolling elements.

* * * * *